United States Patent [19]

Shewchuk

[11] Patent Number: 4,917,528
[45] Date of Patent: Apr. 17, 1990

[54] PANEL JOINT

[76] Inventor: Peter Shewchuk, 940 Meyerside Drive, Mississauga, Canada, L5T 1R9

[21] Appl. No.: 180,090
[22] Filed: Apr. 11, 1988

[30] Foreign Application Priority Data

Apr. 13, 1987 [CA] Canada ................... 534547

[51] Int. Cl.$^4$ ............................................. F16B 12/00
[52] U.S. Cl. ................................... 403/231; 403/353; 403/382; 52/282; 52/284
[58] Field of Search .............. 403/382, 231, 353, 14; 52/281, 282, 283, 285, 286

[56] References Cited

U.S. PATENT DOCUMENTS

| 2,728,957 | 1/1956 | Keller. | |
|---|---|---|---|
| 2,912,013 | 11/1959 | Freyholdt et al. | 403/382 |
| 2,969,268 | 1/1961 | Mason et al. | 52/282 X |
| 3,007,213 | 11/1961 | Hobbs. | |
| 3,290,853 | 12/1966 | Pucci et al.. | |
| 3,485,405 | 12/1969 | Dement | 52/282 X |
| 3,691,711 | 9/1972 | Lowery. | |
| 3,820,296 | 6/1974 | Bebinger | 52/826 |
| 4,508,301 | 4/1985 | Nicholson et al.. | |

FOREIGN PATENT DOCUMENTS 128244 12/1962 France.
214510 2/1973 France.
2448321 9/1980 France.

Primary Examiner—Randolph A. Reese
Assistant Examiner—Carol I. Bordas
Attorney, Agent, or Firm—Kramer, Brufsky & Cifelli

[57] ABSTRACT

A joint structure is disclosed for retaining the peripheral edge of a panel member, as is commonly found in sheet metal cabinets and the like. The joint structure includes an elongate member or extrusion having first and second, spaced-apart transverse flanges, the second flange including a base portion and an outer portion extending toward the first flange to form a C-shaped slot between the flanges. The peripheral edge of the panel is located in the C-shaped slot bearing against both flanges, and a threaded fastener is mounted in one of the flanges disposed at an angle to bear against the panel edge portion and urge same into the slot and releasably retain the edge portion therein.

15 Claims, 2 Drawing Sheets

PANEL JOINT

This invention relates to a panel joint construction wherein a frame or joining member retains the peripheral edge of a panel, such as sheet metal, sheet aluminium, or sheet plastic, as is commonly found in cabinets, wall panels and articles of furniture.

It is common in cabinet, furniture, and wall panel construction to have planar panels made of sheet metal or sheet aluminium or other materials. These panels are commonly held in position by some type of frame member or retaining element. Sometimes the adjacent edges of two of these panels are connected by one of these frame members or retaining elements, and in this case, the connection is sometimes referred to as a joint. However, for the purposes of this disclosure, the term joint is intended to refer to any connection between a frame member or retaining element and the peripheral edge of a panel member. Further, these frame members or retaining elements are often elongate, extruded components, and for the purposes of this disclosure are generally referred to as elongate members.

It is common in this type of elongate member that there be some type of slot or groove into which the peripheral edge of the panel is located. Often, a friction fit is used to retain the peripheral edge of the panel in the elongate member. As would be expected, the friction fit suffers from the disadvantage that the panel is easily dislodged, especially it is made of a material that is deformable or creeps under stress. To overcome this disadvantage, additional means are employed to mechanically lock the panel edge in place. One example of this is shown in U.S. Pat. No. 3,290,853 issued on Dec. 13, 1966 to Joseph Pucci et al. In this example, one flange of the extruded member is bent over to lock the edge of the panel in place. Another example is shown in U.S. Pat. No. 3,691,711 issued on Sept. 19, 1972 to William E. Lowery. In this example, fasteners such as grooves or rivets must pass through the panel and the elongate member. It will be appreciated that a difficulty with the former Pucci structure is that both the panel edge and the extruded member must be specially formed or bent requiring extra steps. A difficulty with the latter Lowery structure is that the fasteners pass through the panel members and are visible.

In the present invention, the panel edge is securely held in the elongate member by releasable retaining fasteners that engage the panel member and are not visible from the side of the joint normally exposed to view.

According to the invention, a panel joint comprises an elongate member having a first transverse flange, a second transverse flange spaced from the first flange, the second flange having a base portion and outer portion extending toward the first flange to define a generally C-shaped slot between the flanges. A planar panel having a peripheral edge portion is adapted to be located in the C-shaped slot to bear against one of the flanges. Also, a releasable retaining element is attached to the other of the flanges and is adapted to engage and hold the panel edge portion in place against said one flange.

Preferred embodiments of the invention will now be described by way of example, with reference to the accompanying drawings, in which.

Figure 1:
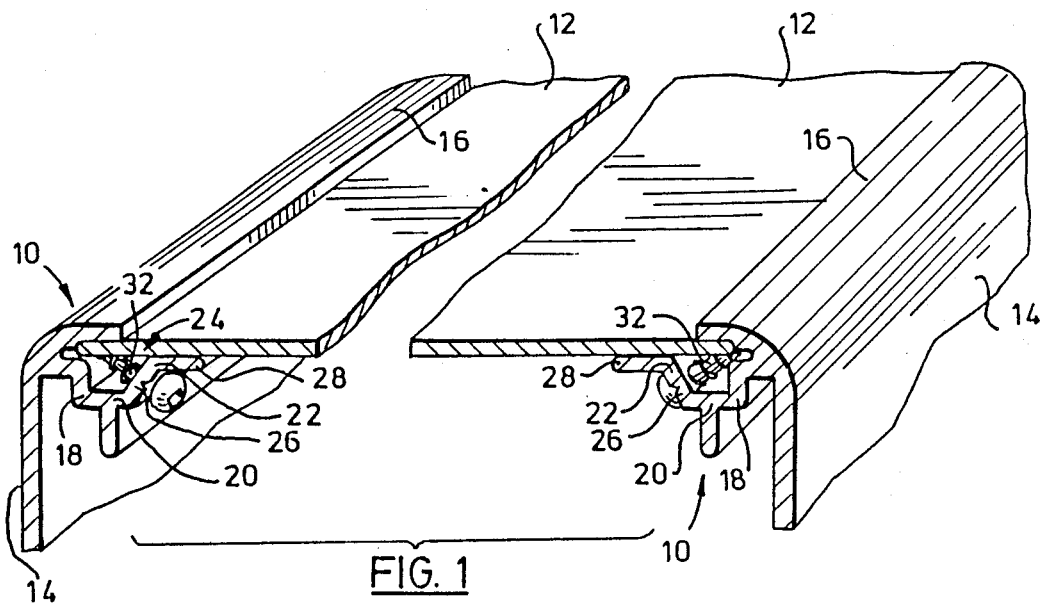
FIG. 1 is a perspective view of a section of a cabinet having a central planar panel and elongate members on opposed sides forming panel joints incorporating a preferred embodiment of the present invention.

Referring firstly to FIGS. 1 to 4, a preferred embodiment of a panel joint according to the present invention is generally indicated by reference numeral 10. In FIG. 1, a portion of a cabinet structure is shown in cross-section having panel joints 10 on opposites sides of a planar panel 12, although joints 10 could be located along any peripheral edge of panel 12.

Panel 12 is typically made of sheet metal, such as sheet aluminium or any suitable plastic material. In the case of sheet aluminium, panel 12 is typically 16 gage or about 16 mm in thickness.

Elongate members 14 form part of joints 10. Elongate member 14 is typically an extruded aluminium component, but it may be formed of other materials as well which are suitable for the particular application. Elongate member 14 has a first transverse flange 16 and a second transverse flange 18 spaced from first flange 16. In the drawings, second transverse flange 18 is spaced below first flange 16 and in the cabinet structure shown in FIG. 1 this would be located inside the structure and not normally visible. However, panel joint 10 could be employed in other configurations as will be appreciated by those skilled in the art.

Second transverse flange 18 has a base portion 20 and an outer portion 22 extending toward first flange 16 to define a generally C-shaped slot 24 located between flanges 16, 18. Outer portion 22 further includes an intermediate portion 26 and a distal portion 28. Intermediate portion 26 is formed with an outer longitudinal pilot groove 30 for locating threaded fasteners 32 as will be described further below.

Figure 2:
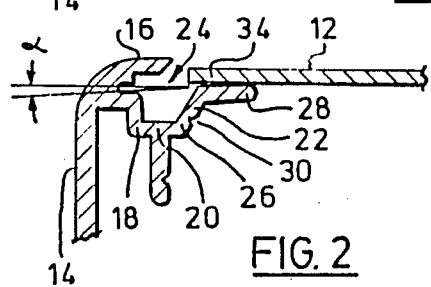
FIG. 2 is a vertical sectional view of the panel joint of FIG. 1 showing the first step in the assembly of the joint.
Figure 3:
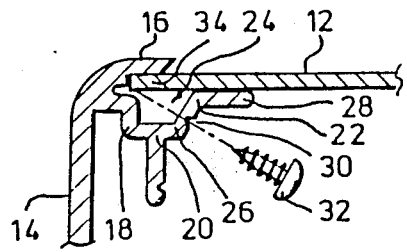
FIG. 3 is a vertical sectional view similar to FIG. 2, but showing the second step in the assembly of the joint.
Figure 4:
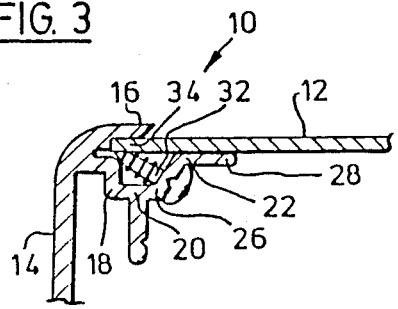
FIG. 4 is a vertical sectional view similar to FIGS. 2 and 3 showing the completely assembled panel joint.

Referring in particular to FIGS. 2 to 4, the assembly of panel joint 10 will now be described.

FIG. 2 shows panel 12 about to be inserted into C-shaped slot 24. Panel 12 has a peripheral edge portion 34 which, when located in slot 24 as shown in FIG. 3, bears against first flange 16 and the distal portion 28 of second transverse flange 18. As seen best in FIG. 2 the second transverse flange distal portion 28 extends outwardly and upwardly relative to first transverse flange 16 and is disposed at an oblique angle α relative thereto. Angle α is typically about 3° and it facilitates the insertion of panel 12, especially where there are two elongate members fixed in position as illustrated in FIG. 1. When the assembly of panel joint 10 is completed, outer portion 22 is normally deflected downwardly, so that distal portion 28 lies parallel to panel 12 and first transverse flange 16. This also puts a slight bending moment on peripheral edge portion 34 and causes transverse flanges 16, 18 to apply pressure to peripheral edge portion 34 to help retain same in position. Alternatively, distal portion 28 can be made parallel to first transverse flange 16 at the outset. In either case, as seen best in FIG. 3, the vertical spacing between first transverse flange 16 and distal portion 28 is general equal to the thickness of panel 12.

Referring again to FIG. 3, when the peripheral edge portion 34 of panel 12 is located in C-shaped slot 24, threaded fasteners 32 are mounted or screwed into intermediate portion 26 at longitudinally spaced-apart along intervals pilot groove 30. Fasteners 32 are typically self tapping screws, and as seen in FIGS. 3 and 4 are disposed at an angle to the panel peripheral edge portion 34, so that upon advance of the fasteners 32, the fasteners engage or bite into the edge of panel edge portion 34 to urge the panel edge portion 34 into the C-shaped slot 24. Intermediate portion 26 is disposed at such an angle that screws 32 entering intermediate portion 26 perpendicular thereto engage the panel peripheral edge portion 34 as seen best in FIGS. 3 and 4. It will be appreciated that threaded fasteners 32 are releasable retaining elements, in that upon removal of threaded fasteners 32, panel joint 10 can be disassembled.

Figure 5:
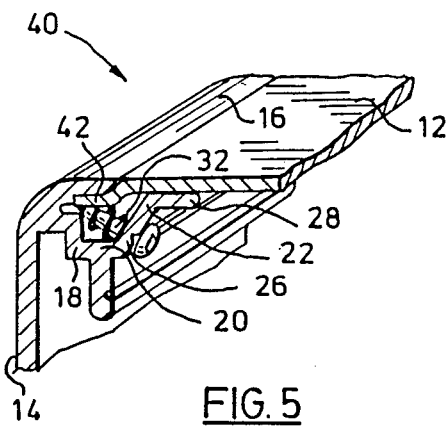
FIG. 5 is a perspective view of a section of another embodiment of the panel joint of the present invention wherein the planar panel has an offset peripheral edge so that the outer surface thereof is flush with the elongate member.

Referring next to FIG. 5, there is shown a panel joint 40 which is similar to panel joint 10 except that panel 12 has a peripheral edge portion 42 which is offset, so that the top surface of panel 12 is flush with the adjacent top surface of elongate member 14. In this embodiment, the intermediate portion 26 of second transverse flange 18 is made wider by approximately the thickness of panel 12, so that the top surface of distal portion 28 is generally in line with the bottom surface of first transverse flange 16. The offset in peripheral edge portion 42 of panel 12 is typically made by a rolling operation. However, the offset could be made by machining, in which case panel 12 would be thicker and intermediate portion 26 would be the same size in joints 10 and 40.

Figure 6:
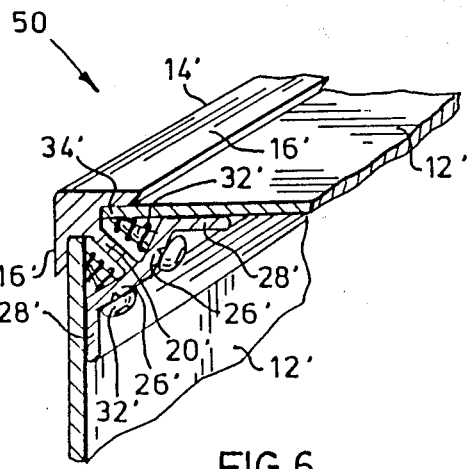
FIG. 6 is a perspective view of a section of another embodiment of the panel joint of the present invention wherein two planar panels are formed into a corner joint.
Figure 7:
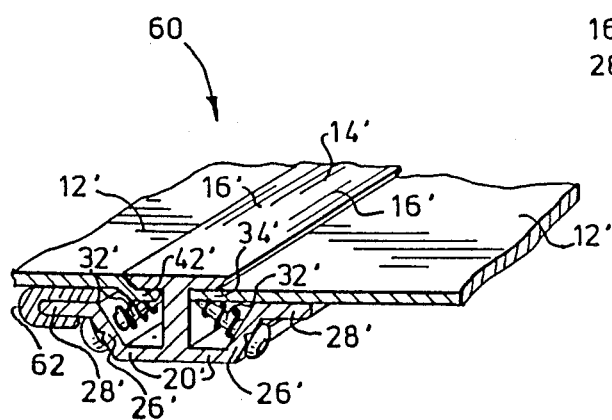
FIG. 7 is a perspective view of a section of yet another embodiment of the panel joint of the present invention wherein two planar panels form a butt joint, the panel on the left being flush with the elongate member.
Figure 8:
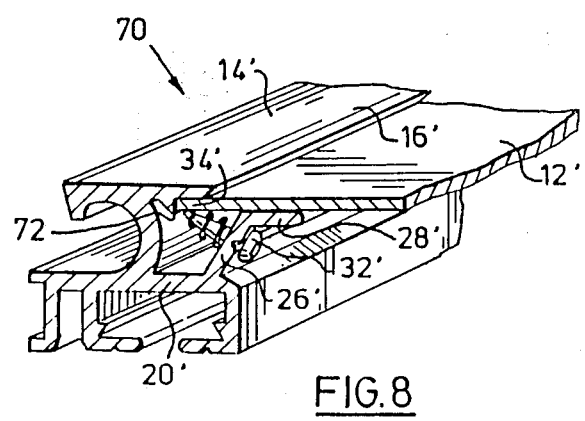
FIG. 8 is a perspective view of a section of yet another embodiment of the present invention wherein the elongate member is part of a hinge.

FIGS. 6, 7 and 8 show still further embodiments of panel joints according to the present invention, and in these embodiments, primed reference numerals are used to indicate parts similar to those of FIGS. 1 to 5.

In FIG. 6, a corner joint 50 is shown, and in this embodiment, elongate member 14' has a pair of C-shaped slots allowing the respective panels 12' to be orientated at right angles. It will be appreciated that in this embodiment the second transverse flanges share a common base portion 20'.

In FIG. 7, the panel joint 60 has an elongate member 14' with a pair of opposed C-shaped slots to form a butt joint between respective panels 12', 12'. In the left hand side of panel joint 60, a panel 12 is shown with an offset or rolled peripheral edge portion 42' similar to that of FIG. 5, so that the top surface of the left panel 12' is flush with the top surface of elongate member 14'. Panel joint 60 also shows an additional variation employing an elongate spacer 62, so that both intermediate portions 26', 26' may be of the same width. This allows flat panels 12' to be used in either side of panel joint 60 simply by removing spacer 62, or alternatively, offset panels 12' can be used on either side of panel joint 60 by using spacers 62 on both distal portions 28 as desired.

FIG. 8 shows yet another embodiment of a panel joint 70 wherein the elongate member 14' is formed as part of an extruded hinge. The extruded hinge structure is not part of the present invention, so will not be described in further detail. It will be noted however, that first transverse flange 16' is formed with a downwardly extending ridge 72 to act as a stop for the insertion of panel 12'.

Having described preferred embodiments of the present invention, it will be appreciated that various modifications may be made to the structures described. For example, it will be apparent that the panel joints of the present invention can be formed as part of any type of elongate member 14. The dimensions of the panel joints can be varied to suit various thicknesses or shapes of panel peripheral edge portions. Also, it is not necessary that the elongate members 14 be extruded members, they could be made in any length desired and by any other process, such as by machining or molding if desired. Finally, where it is desired to have a water proof or air impervious joint, the space between first and second transverse flanges 16, 18 and panel 12 can be filled with a suitable sealant.

From the above it will be appreciated that the present invention provides a very secure joint structure, without the need for riveting, welding, machining or metal deformation, except where desired for aesthetic purposes to make the top surface of the panels flush with the outer surfaces of the elongate members.

I claim:

1. A panel joint comprising:
   an elongated member having a first transverse flange;
   a second transverse flange spaced from said first flange, the second flange having a base portion and an outer portion extending toward the first flange to a define a generally C-shaped slot between said flanges;
   a planar panel having a peripheral edge portion adapted to be located in said C-shaped slot to bear against one of said flanges; and
   a releasable retaining element attached to the other of said flanges which engages and urges said panel edge portion against said one flange.

2. A panel joint as claimed in claim 1 where the releasable retaining element is a threaded fastener and is threadably mounted in said other flange to move upon rotation toward and away from the panel edge portion.

3. A panel joint as claimed in claim 2 wherein the second transverse flange is said other flange and wherein said second flange outer portion includes an intermediate portion and a distal portion, the intermediate portion being located between the base portion and the distal portion, the threaded fastener being mounted in said intermediate portion.

4. A panel joint as claimed in claim 3 wherein said threaded fastener is disposed at an angle to the panel edge portion, so that upon advance of the threaded fastener, said fastener engages and urges the panel edge portion into the C-shaped slot.

5. A panel joint as claimed in claim 4 wherein the second flange intermediate portion has an outer longitudinal pilot groove formed therein for locating the threaded fastener.

6. A panel joint as claimed in claim 2 wherein the second transverse flange is said other flange, and wherein the panel edge portion is adapted to bear against both the first transverse flange and the outer portion of said second transverse flange.

7. A panel joint as claimed in claim 6 wherein the second transverse flange outer portion has an intermediate portion and a distal portion, the intermediate portion being located between the base portion and the distal portion, the threaded fastener being mounted in said intermediate portion.

8. A panel joint as claimed in claim 7 wherein said threaded fastener is disposed at an angle to the panel edge portion, so that upon advance of the threaded fastener, said fastener engages and urges the panel edge portion into the C-shaped slot.

9. A panel joint as claimed in claim 8 wherein the second transverse flange distal portion is disposed generally parallel to the first transverse flange.

10. A panel joint as claimed in claim 8 wherein the second transverse flange distal portion is disposed at an oblique angle extending outwardly and upwardly relative to the first transverse flange.

11. A panel joint as claimed in claim 7 wherein the second transverse flange distal portion is disposed generally parallel to the first transverse flange.

12. A panel joint as claimed in claim 7 wherein the second transverse flange distal portion is disposed at an oblique angle extending outwardly and upwardly relative to the first transverse flange.

13. A panel joint as claimed in claim 7 wherein the second flange intermediate portion has an outer longitudinal pilot groove formed therein for locating the threaded fastener.

14. A panel joint as claimed in claim 6, wherein the second transverse flange is disposed generally parallel to the first transverse flange.

15. A panel joint as claimed in claim 6, wherein the second transverse flange is disposed at an oblique angle extending outwardly and upwardly relative to the first transverse flange.

* * * * *